US011972358B1

(12) United States Patent
Agley et al.

(10) Patent No.: US 11,972,358 B1
(45) Date of Patent: Apr. 30, 2024

(54) CONTEXTUALLY RELEVANT CONTENT SHARING IN HIGH-DIMENSIONAL CONCEPTUAL CONTENT MAPPING

(71) Applicant: OBRIZUM GROUP LTD., Cambridge (GB)

(72) Inventors: Chibeza Chintu Agley, Cambridge (GB); Juergen Fink, Cambrige (GB); Sarra Achouri, Cambridge (GB); Vishnu Hariharan Anand, Cambridge (GB); Matthew Jonathan Chadwick, Stroud (GB)

(73) Assignee: OBRIZUM GROUP LTD., Cambridge (GB)

( * ) Notice: Subject to any disclaimer, the term of this patent is extended or adjusted under 35 U.S.C. 154(b) by 0 days.

(21) Appl. No.: 17/965,215

(22) Filed: Oct. 13, 2022

(51) Int. Cl.
*G06N 5/022* (2023.01)
*G06Q 30/02* (2023.01)
*G06Q 30/0283* (2023.01)

(52) U.S. Cl.
CPC ............. *G06N 5/022* (2013.01); *G06Q 30/02* (2013.01); *G06Q 30/0283* (2013.01)

(58) Field of Classification Search
CPC ..................................................... G06N 5/022
See application file for complete search history.

(56) References Cited

U.S. PATENT DOCUMENTS

| 7,609,267 B2 * | 10/2009 | Evans ................... G06F 16/287 345/440 |
| 2003/0126136 A1 * | 7/2003 | Omoigui ................. H04L 67/02 |
| 2007/0094210 A1 * | 4/2007 | Craig ....................... G06N 5/02 706/50 |
| 2011/0173225 A1 | 7/2011 | Stahl et al. |
| 2018/0276206 A1 * | 9/2018 | Saini ....................... G06F 16/23 |

FOREIGN PATENT DOCUMENTS

| CN | 108648119 A | 10/2018 |
| EP | 4016324 A1 | 6/2022 |
| KR | 20190070368 A | 6/2019 |
| KR | 20190091228 A | 8/2019 |

OTHER PUBLICATIONS

Farahani, Abolfazl, et al., "A Concise Review of Transfer Learning", 2020 International Conference on Computational Science and Computational Intelligence (CSCI), 2020, pp. 344-351.

(Continued)

*Primary Examiner* — Van H Oberly
(74) *Attorney, Agent, or Firm* — Dorsey & Whitney LLP

(57) ABSTRACT

An example method disclosed herein includes receiving a request for content items relevant to a concept within a first knowledge space, where the first knowledge space includes a plurality of concept groupings of a plurality of nodes representing a plurality of content items. The method further includes identifying a plurality of content items in a second knowledge space relevant to the concept and receiving a selection of one or more of the content items for addition to the first knowledge space. The method further includes adding the selected content items to the first knowledge space.

21 Claims, 10 Drawing Sheets

(56) References Cited

OTHER PUBLICATIONS

Hamer, Victor, et al., "Robust Selection Stability Estimation in Correlated Spaces", Springer Nature Switzerland AG 2021, 2021, pp. 446-461.

He, Shichang, et al., "ECDT: Exploiting Correlation Diversity for Knowledge Transfer in Partial Domain Adaptation", 16th International Conference on Mobility, Sensing and Networking (MSN), 2020, pp. 746-751.

Lu, Jie, et al., "Transfer learning using computational intelligence: A survey", Knowledge Based Systems, vol. 80, Jan. 22, 2015, pp. 14-23.

Yuan, Guangji, "Connecting knowledge spaces: Enabling cross-community knowledge building through boundary objects", vol. 50, No. 5, British Journal of Educational Technology, 2019, pp. 2144-2161.

Zhuang, Fuzchen, et al., "A Comprehensive Survey on Transfer Learning", vol. 109, No. 1, Proceedings of the IEEE, Jan. 2021, pp. 43-76.

* cited by examiner

Content Title:
Subject Rights

About:
[Delete account] [Access to data] [Right to be informed]

Summary:
Do you know that subjects Rights have changed under the GDPR...

Recommended for:

Information Security [Highly recommended] [Cost: 5] [Buy]

Data Privacy [Moderately recommended] [Cost: 3] [Buy]

[Preview] [Charts]

CONTEXTUALLY RELEVANT CONTENT SHARING IN HIGH-DIMENSIONAL CONCEPTUAL CONTENT MAPPING

TECHNICAL FIELD

The present disclosure relates generally to content management systems and examples of sharing content items between content management systems.

BACKGROUND

Content management systems may be used to store and provide educational content. Adding new content to a knowledge space of the content management system may be a difficult process for organizations and may involve generating new content, locating new content, negotiating with content owners, and the like. Knowledge spaces with more content covering various topics may be more useful for successfully teaching those topics than knowledge spaces with less content covering each topic.

SUMMARY

An example method disclosed herein includes receiving a request for content items relevant to a concept within a first knowledge space, where the first knowledge space includes a plurality of concept groupings of a plurality of nodes representing a plurality of content items. The method further includes identifying a plurality of content items in a second knowledge space relevant to the concept and receiving a selection of one or more of the content items for addition to the first knowledge space. The method further includes adding the selected content items to the first knowledge space.

Another example method disclosed herein includes receiving a plurality of content items to be added to a content bank, where the content bank includes a plurality of nodes representing a plurality of content items and a first set of relationships between the plurality of nodes. The method further includes verifying a quality level of the plurality of content items, determining prices for the plurality of content items, and adding the plurality of content items to the content bank.

An example central content management system disclosed herein includes a content bank including a plurality of nodes representing a plurality of content items, where the content bank includes a set of relationships between the plurality of nodes and a content bank manager configured to receive a request from a user associated with an organization to add content items from the content bank to a knowledge space associated with the organization. The central content management system further includes a content asset suggestion module configured to identify a group of content items of the content bank similar to the knowledge space and a content asset transfer module configured to transfer one or more of the group of content items from the content bank to the knowledge space.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 8 illustrates an example user interface showing output of a recommendation algorithm for recommending content items for knowledge spaces, in accordance with various embodiments described herein.

DETAILED DESCRIPTION

Figure 1:
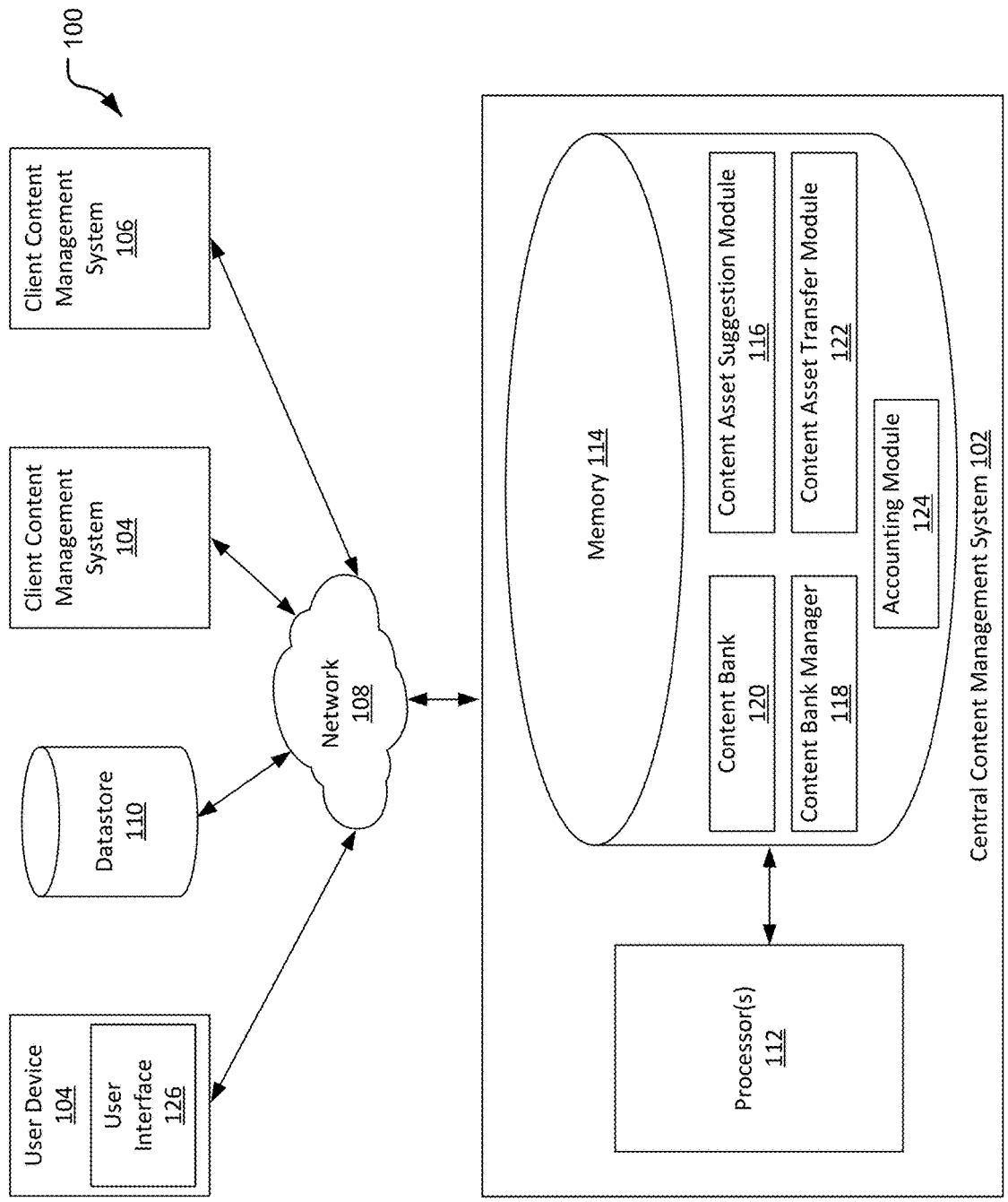
FIG. 1 illustrates an example system including a central content management system in communication with client content management systems, in accordance with various embodiments described herein.

The content management system described herein may generally use a process of contextualization to create a knowledge space representing various content items grouped according to concepts represented by or reflected within the content items (e.g., topics covered within the content items). Such a knowledge space may be used to, for example, provide trainings or other types of online learning or assessment by ensuring that participants are presented with content items from the representative concept groups and/or demonstrate knowledge of the various concept groups. For example, trainings centered around a particular concept group or topic may display content focused on or including those concepts, and eliminate or not present irrelevant content. This is more time efficient for the user (i.e., training time is not wasted in watching or consuming off-concept content), and can enable reasonable proof of capability, compliance, and/or understanding much faster than conventional learning and assessment techniques.

Technology capable of automatically analyzing and recommending useful content may support the building, updating, and refreshing of large training and assessment catalogs between departments, subsidiaries, partners, third-party content providers, and/or other parties in a variety of locations. Furthermore, evaluation of user engagement and performance in related assessments following content element exposure can help to evaluate the usefulness and knowledge transfer quality of any given content element. Automatic recommendation of learning elements based on proven knowledge transfer quality may increase learner satisfaction and reduce overall time spent on knowledge acquisition.

The contextualization process may process the content items to generate a corpus, generate a probability model to identify concept groupings within the corpus, and generate a knowledge model including nodes representing the content items and edges between the nodes representing the relationships between content items. In other words, the contextualization may mathematically (e.g., graphically) represent relationships of any given content to all other content, which allows for related content (e.g., similar concepts covered within the content) to be referenced and consumed easily by a user. For example, such knowledge models may be used to present content to users, e.g., an online course may present initial content from various content groupings to ensure users are presented with content representing key concepts in the course. In some examples, content items may include assessment items, to gauge how well a user understands the concepts provided in the course. In some examples, the system may further gauge how well a user understands the concepts provided in a course by measuring additional factors, such as how much users are engaging with particular content and/or concepts and/or how much users enjoy the content (e.g., measured by ratings). Where a user is having difficulty with a particular concept, the knowledge model may be utilized to provide the user with additional informational content relating to the concept. Additionally, only relevant on-topic content is presented to the user, expediting understanding and learning, by focusing the content consumption on relevant content.

Companies and/or organizations utilizing content management systems described herein may have difficulties in adding new content to their respective content management systems. For example, a company may utilize a content management system to conduct employee trainings on safety policies, cybersecurity, and other relevant content areas. When a company begins expansion of trainings in a particular content area, their existing knowledge space may be small, and it may be time consuming and costly to find or generate content to expand the knowledge space. Similarly, a company may observe that its employees tend to struggle with content in a particular content area. While additional content may assist the employees' understanding, it may again be time consuming and costly to find such additional content. For example, companies may wish to expand training on new regulations. While a company or organization may have a copy of the regulations for training, the company may be unsure of which content items from their available multimedia content resources would be most appropriate to conduct such training.

The central content management system described herein may provide new content to organizations quickly by creating a centralized content bank with content items relevant to a variety of concepts. The content bank may be organized similarly to the knowledge spaces utilized by individual companies, such that a company may, for example, select a concept and the central content management system may locate various content items in the content bank relevant to the selected concept. Additionally, the company may configure the system to generate recommendations based on one or more of the concepts included in knowledge spaces owned by and/or associated with the company. The central content management system may further facilitate sharing of content items between companies or organizations utilizing similar content by identifying such organizations and facilitating sharing and/or trading of content using the central content management system to verify quality, price content items, and transfer content items into knowledge spaces already utilized by the organizations. Accordingly, the central content management system provides for efficient content sharing or commercial content exchange within or between departments or organizations, allowing these entities to identify and obtain additional content for trainings, courses, assessments, qualifications, certifications, and/or other educational programs in an efficient manner.

Though the content management system is described with respect to educational and/or instructional materials, such contextual content recommendations based on weighting and conceptual concept mapping may be used in other applications. For example, weighting of content within content models may be useful in digital asset management or physical asset management (e.g., where a digital tracking or labeling system is used to track physical assets), recommending content to match regulations or specific learning objectives, resume analysis and recommendations for specific job roles, or more generally, the bidirectional movement of conceptually related content between any two or more contextually associated groupings of content. The content management system may further be applied in any area where content is shown or recommended to users and/or user or usage data is collected. For example, the content management system may be used for social media applications, advertising recommendations, entertainment recommendations (e.g., in streaming services), and the like.

Various embodiments of the present disclosure will be explained below in detail with reference to the accompanying drawings. Other embodiments may be utilized, and structural, logical and electrical changes may be made without departing from the scope of the present disclosure.

FIG. 1 illustrates an example system 100 including a central content management system 102 in communication with client content management systems 104 and 106. Various user devices (e.g., user device 105 of FIG. 1) may connect to the central content management system 102 and/or the client content management systems 104 and/or 106 to access and utilize the content management system 102 and/or the content management systems 104 and 106. The user device 105 may access the central content management system 102 using a mobile application, web page, desktop application, or other methods. The central content management system 102 and/or the client content management systems 104 and 106 may, in various examples, be hosted in a cloud computing environment, accessible by the user device 105. In other examples, the central content management system 102 may reside on one or more servers (e.g., web servers) accessible by the user device 105, the client content management systems 104 and 106, and the datastore 110. In various examples, the central content management system 102 and one or both of the client content management systems 104 and 106 may be hosted in the same computing environment.

Generally, the user device 105 and other user devices accessing the central content management system 102 may be devices belonging to an end user accessing the content management system 102. A user device 105 may be used, for example, to upload new content for inclusion in a knowledge space, to access content items for a knowledge space from the content bank 120, to add content items to the content bank 120, and otherwise interact with the central content management system 102 and/or client content management systems 104 and/or 106. In various embodiments, additional user devices may be provided with access to the central content management system 102. Where multiple user devices access the central content management system 102, the user devices may be provided with varying permissions, settings, and the like, and may be authenticated by an authentication service prior to accessing the central content management system 102. For example, user devices may access the central content management system 102 using multi factor authorization or identification before accessing and/or obtaining content from the central content management system 102. In various implementations, the user device 105 and/or additional user devices may be implemented using any number of computing devices included, but not limited to, a desktop computer, a laptop, tablet, mobile phone, smart phone, wearable device (e.g., AR/VR headset, smart watch, smart glasses, or the like), smart speaker, vehicle (e.g., automobile), or appliance. Generally, the user device 105 may include one or more processors, such as a central processing unit (CPU) and/or graphics processing unit (GPU). The user devices 104 and 106 may generally perform operations by executing executable instructions (e.g., software) using the processors.

In various examples, the central content management system 102 may monitor and collect information about interactions of the user device 105 with content items of the content bank 120. In some examples, such information may be collected via user interface 126 of the user device 105. Such interactions may be stored as attributed associated with content elements to improve future recommendations of content elements to client content management systems 104 and 106.

In some examples, the user interface 126 at the user device 105 may be used to provide information (e.g., selection of content items to add to the content bank 120, selection of concepts for locating similar content items in the content bank 120, etc.) to, and display information (e.g., content items and/or pricing) from the central content management system 102. In various embodiments, the user interface 126 may be implemented as a React, Javascript, HTML, CSS, or ClojureScript-based interface for interaction with the central content management system 102 and/or the client content management systems 104 and/or 106. The user interface 126 may also access various components of the central content management system 102 locally at the user device 105 through webpages, one or more applications at the user device 105, or using other methods. For example, the user interface 126 may access the central content management system 102 indirectly by first accessing the client content management system 104, which then accesses the central content management system 102. The user interface 126 may also be used to display content generated by the central content management system 102, such as content items and pricing for content items to the user device 105. The user interface 126 may also be used to display suggestions of content and/or to approve content which could be 'sold' or otherwise provided to the central content bank 120. Such approval may be received via the user interface 126 from the user responsive to a recommendation prompt presented at the user interface 126.

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Various components of the system 100 may communicate using different network protocols or communications protocols based on location. For example, components of the central content management system 102 may be hosted within a cloud computing environment and may communicate with each other using communication and/or network protocols used by the cloud computing environment.

The system 100 may include one or more datastores 110 storing various information and/or data including, for example, content and the like. Content may include, in some examples, learning or informational content items and/or materials. For example, learning content items may include videos, podcasts, slides, 360 degree panoramic videos, papers, articles, presentations, images, questions, answers, and the like. Additional examples of learning content may include product descriptions, employee or customer questions or feedback, voice clips, sound clips, 3D models (e.g., DNA, CAD models). For example, the learning content may include testing lab procedures, data presented in an augmented reality (AR), virtual reality (VR), and/or mixed reality (MR) environment. In non-limiting examples, additional content that may be presented in an VR/AR/MR environment may include three-dimensional (3D) models overlaid in an AR environment, links of information related to product datasheets (e.g., marketing piece, product services offered by the company etc.), a script that underlies the video, voice or text that may be overlaid in an AR environment. As should be appreciated, the content can include various types of media, such as an existing video, audio or text file, or a live stream captured from audio/video sensors or other suitable sensors. The type and format of the content items may be varied as desired and as such the discussion of any particular type of content is meant as illustrative only. Additional user interaction data may be collected and stored in the datastore as an attribute of the content elements to facilitate better identification of suitable content for the content management systems 104, 106 and/or the central content management system 102.

In various implementations, the central content management system 102 may include or utilize one or more hosts or combinations of compute resources, which may be located, for example, at one or more servers, cloud computing platforms, computing clusters, and the like. Generally, the central content management system 102 is implemented by a computing environment which includes compute resources including hardware for memory 114 and one or more processors 112. For example, the central content management system 102 may utilize or include one or more processors, such as a CPU, GPU, and/or programmable or configurable logic. In some embodiments, various components of the central content management system 102 may be distributed across various computing resources, such that the components of the central content management system 102 communicate with one another through the network 108 or using other communications protocols. For example, in some embodiments, the central content management system 102 may be implemented as a serverless service, where computing resources for various components of the central content management system 102 may be located across various computing environments (e.g., cloud platforms) and may be reallocated dynamically and automatically according to resource usage of the central content management system 102. In various implementations, the central content management system 102 may be implemented using organizational processing constructs such as functions implemented by worked elements allocated with compute resources, containers, virtual machines, and the like.

The memory 114 may include instructions for various functions of the central content management system 102 which, when executed by the processor 112, perform various functions of the central content management system 102. For example, the memory 114 may include instructions for implementing a content asset suggestion module 116, a content bank manager 118, a content asset transfer module 122, and an accounting module 120. The memory 114 may further include data utilized and/or created by the central content management system 102, such as a content bank 120. Similar to the processor 112, memory resources utilized by the central content management system and included in the central content management system 102 may be distributed across various physical computing devices.

In various examples, the content bank 120 is a knowledge space including a plurality of nodes representing content items. For example, the content bank 120 may be, in various examples, a graph of other type of relational or linking structure that includes multiple nodes, the nodes representative of various content items (e.g., content items stored at datastore 110). The nodes of the content bank 120 may store the content items themselves and/or links to such content items. The nodes of the content bank 120 may themselves carry or have a plurality of additional attributes. Additional content attributes (e.g., usage statistics, content ratings, and the like) may be collected, stored, and called upon using instructions and functions included in the memory. Such content attributes may be stored in the content bank 120 and/or in the datastore 110. The graph may include multiple edges between nodes, where the edges include weights, which could represent probabilities of two corresponding topics (nodes) belonging to the same concept or related concepts. Such probabilities may be used to position nodes representing the content items relative to one another in space. In various examples, edges between nodes of the content bank 120 may be weighted, where the weight represents a strength of the relation between nodes connected by the edge. As such, the content bank 120 may represent sets of relationships between the content items correlating to the content bank 120. In some examples, nodes of the content bank 120 may be clustered and/or grouped to create groupings of items covering similar concepts (e.g., concept groupings). Content items not stored in the content bank 120 (e.g., content items from the datastore 110 or from client content management systems 104 and/or 106 may be associated with these clusters or groups to, for example, inform suggestions for content sharing. Similarly, clusters and groups can be identified in the datastore 110, client content management systems 104, 106, and or in the content bank 120. Content items may be recommended from other sources based on, for example, their mathematical relationship to any such cluster or group and based on other content attributes stored for any such content item.

In various examples, the content bank 120 may be distributed across several physical storage locations, which may communicate through the network 108. For example, a first portion of the content bank 120 including content accessible by a first entity may be stored in a first physical location while a second portion of the content bank 120 including content accessible by a second entity may be stored in a second physical location.

In various examples, the content items included in and/or represented by the content bank 120 may include generic content items in a variety of subject areas (e.g., content items generated by a service company maintaining the content bank 120) and/or may include content items offered to the content bank 120 by other entities. Generally, entities with access to the content bank 120 (e.g., through a client content management system 104) may be able to access the content bank 120 and/or the content items of the content bank 120.

In some examples, content items offered to the content bank 120 may be reviewed for quality (e.g., accuracy) before being added to the content bank 120. For example, quality of content items may be quantified based on a combination of features and/or scores. For example, features may include how objective a text is (e.g., how much factual information is included in a text), test causality (e.g., the number of casual words in a text divided by the number of non-stop words in the text), grammatical errors (e.g., the percentage of text without grammatical errors), named entity coverage (e.g., a ratio of a total number of named entities with respect to the length of the text), text richness (e.g., using the Yule metric).

For example, text causality may be useful to determine whether a text is an argumentative discourse, which may be intended to express opinions about a topic. To understand whether a text is an argumentative discourse, cause and effect words may be located within a text. A list may be created of cause and effect and scientific linking words, and frequency may be calculated for those words, normalized according to text length. Such frequencies may be used to determine a text causality score or metric. Objectivity of a text may be quantified to ensure that text or content is based on factual information rather than opinion. Richness may be evaluated using a Yule metric to compute the constancy, where a higher number means a higher diversity of words, representing a richer vocabulary. The value obtained through the Yule metric may be converted to a percentage value to represent richness of the text.

Text correctness is another criterion that may be evaluated to quantify quality of content items. Correctness may be evaluated using methods which correct grammatical errors. The number of differences between the original text and the corrected text may be compared to quantify correctness of the text. The quantifications of the various features described above may be analyzed to determine if a text is high enough quality to add to the content bank 120. For example, minimum threshold values for each feature may be identified, and text may be added to the content bank 120 when the calculated feature values each exceed the respective threshold values. In other examples, the metrics may be provided to an equation or function to generate an overall quality score, which may be used to determine whether to add to the content bank 120.

In various examples, the content bank manager 118 may manage the content bank 120 by evaluating new content that a user asks to sell to the content bank 120 and by identifying similar organizations in order to facilitate direct trading of content items between organizations. In some examples, the central content management system 102 may actively recommend that content items be provided to or sold to the content bank 120. For example, a user may offer up a content item to add to the content bank 120 and the content bank manager 118 may analyze the text of the content item in order to locate the content item within the content bank 120 and to analyze the quality of the content item, for example, based on concept coverage, complexity, and/or based on various content attributes collected from user interactions. The content bank manager 118 may then position the new content item within the content bank 120. The content bank manager 118 may facilitate direct trading between organizations by locating similar organizations when an organization requests new content.

In some examples, the content bank manager 118 may identify similar organizations by analyzing the knowledge spaces of each organization and then comparing the knowledge spaces. The content bank manager 118 may further analyze individual concepts within knowledge spaces of each organization. For example, the content bank manager 118 may, for each node in a knowledge space, create an embedding of the text features of the content item. The content bank manager 118 may then calculate a center for the knowledge space by averaging the embeddings of the content items. The content bank manager 118 may further calculate centers for individual concepts within the knowledge spaces. Where applicable, the content bank manager may then calculate an organization center by averaging the centers for all of the organization's knowledge spaces. The content bank manager 118 may compare organizations based on the closeness of the organization centers.

The content asset suggestion module 116 may utilize input information (e.g., a content item or concept) provided by an organization requesting new content from the content bank 120 to locate new content items to present to the organization. In some examples, the content asset suggestion module 116 may further suggest content for an organization without additional input from the organization, using the existing knowledge spaces of the organization. For example, the content asset suggestion module 116 may utilize a knowledge space center and/or organizational center and may compare nodes in the content bank 120 to one of the respective center values (e.g., using an embedding of the content item associated with the node).

The content asset suggestion module 116 may rate nodes in the content bank 120 as highly relevant to the organization, moderately relevant to the organization, or minimally relevant to the organization based on the node's location relative to the selected center. For example, nodes very close to the organizational, knowledge space, or concept center may be highly relevant to the organization, while nodes farther from either or all centers may be moderately or minimally relevant to the organization. In various examples, the classifications of highly relevant, moderately relevant, and minimally relevant may be associated with cutoff distances from a center value, and nodes may be categorized based on their calculated distance to the center. The content asset suggestion module 116 may use a variety of similarity metrics to categorize nodes, such as Jacquard, cosine, and Euclidian metrics.

In various examples, the content asset suggestion module 116 and/or the content bank manager 118 may create embeddings of nodes of the content bank 120, knowledge spaces of client content management systems 104 or 106, and/or items being added to the content bank 120. The content asset suggestion module 116 and/or the content bank manager 118 may utilize a sentence transformers model (e.g., paraphrase-MiniML6-v2) to create the embeddings. A sentence transformers model may map sentences and paragraphs to a high-dimensional dense vector space to create embeddings, which can be used for various tasks such as clustering or semantic search.

Additional content attributes collected from user interaction data, such as time spent viewing, user-directed quality or appreciation rating, and/or performance on directly associated or nearest neighbor assessments, may inform the strength of recommendations.

The content asset suggestion module 116 may also, in various examples, utilize an adaptive pricing model to price suggested content from the content bank 120 and/or from other organizations. In various examples, the content asset suggestion module 116 may utilize similarity of content, quality of content, type of asset (e.g., video, audio, pdf), and/or length or size of the content item in determining the price of the content item. For example, video content may be priced higher than text content due to the proportional effort involved in creating video content relative to text content. In some examples, a content item related to a concept for which there are relatively few content items in the content bank 120 may be priced higher than a content item related to a concept for which there are many content items in the content bank 120. In some examples, the price may be a weighted averaging of such factors.

In some examples, the price of a content item may be determined by comparing a node associated with the content item to other nodes in a knowledge space and/or concepts within a knowledge space. For example, a content item may be priced higher when it fills a perceived gap in a knowledge space (e.g., it is not similar to other content items already in the knowledge space). Such similarity may be semantic similarity (e.g., determined using sentence transformers to create embedding feature vectors and cosine similarity between such vectors), lexical similarity (e.g., determined using n-gram similarity with a space). Semantic similarity and lexical similarity may then be provided to a formula which factors into pricing for the content item, along with, for example, the type of asset, length of asset, and quality of the text.

Figure 9:
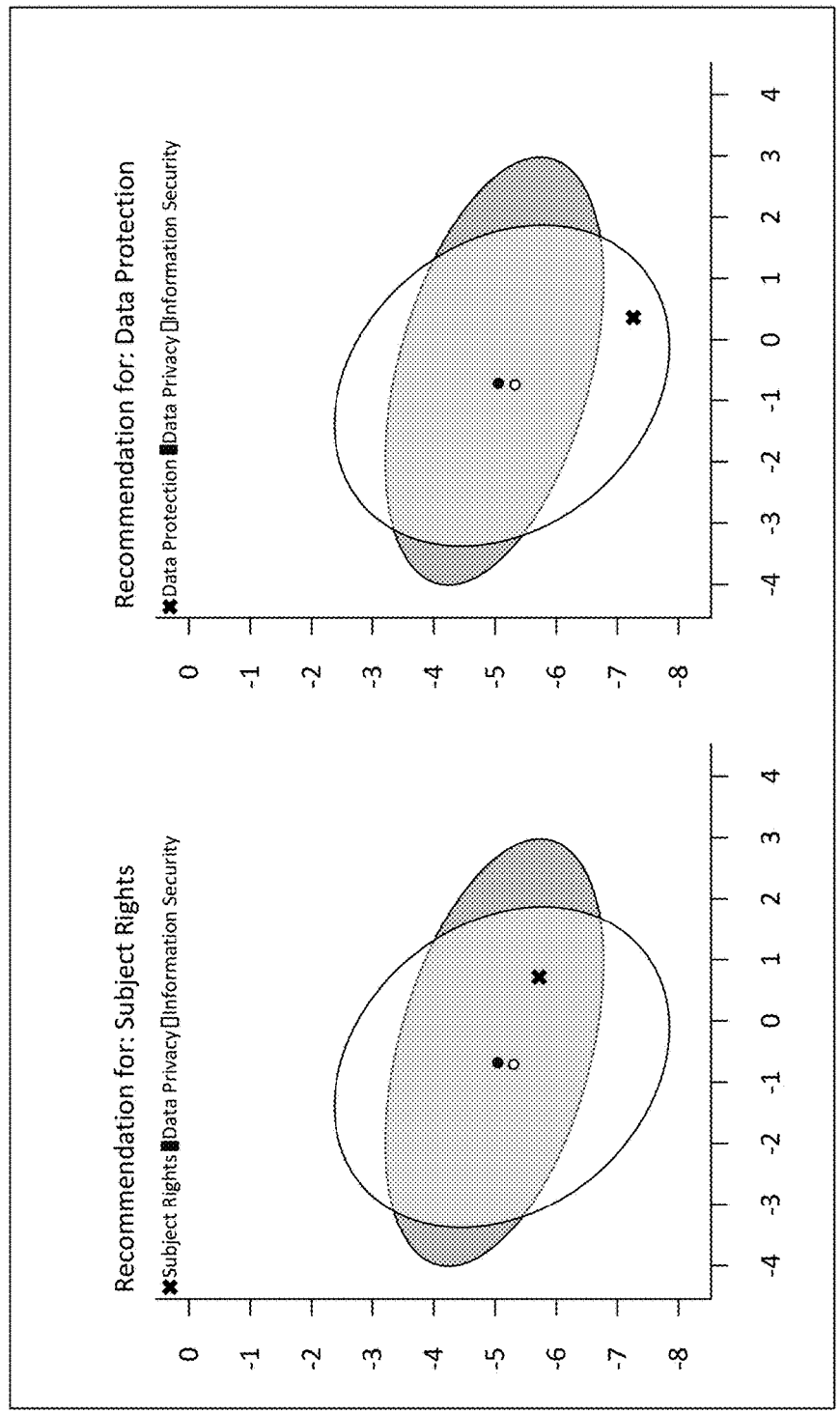
FIG. 9 illustrates an example relationship between content items, concept centers of concept clusters, and concept centers of knowledge spaces, in accordance with various embodiment described herein.

The content asset transfer module 122 may, in various examples, provide suggested content items to a user and may facilitate transfer of selected content items to a knowledge space selected by the user. For example, the content asset transfer module 122 may provide keywords for suggested content items, previews of suggested content items, and other similar features to assist in selection of content items. In some examples, the content asset transfer module 122 may further provide previews of suggested content items within existing knowledge spaces and/or concepts (e.g., as shown in FIG. 9). The content asset transfer module 122 may communicate with a client content management system 104 to place new content items within a knowledge space. In some examples (e.g., when one or a relatively small number of content items are purchased), the content asset transfer module 122 may place the new content items within the existing knowledge space. Where a larger number of content items are purchased or the knowledge space has not recently been recontextualized, the content asset transfer module 122 may communicate with the client content management system 104 to recontextualize (e.g., rebuild) the knowledge space including the new content item or content items. In some examples, the content asset transfer module 122 may place new content items within a knowledge space using delta positioning techniques instead of recontextualizing the knowledge space.

The accounting module 124 may track selling and buying actions of an organization. For example, the accounting module 124 may track when an organization sells a content item to the content bank 120 and/or directly to another organization, when an organization removes a previously sold content item from the content bank 120, when an organization buys a content item from the content bank 120 and/or from another organization, when an organization terminates a subscription to a node or content item, and other similar actions.

Figure 2:
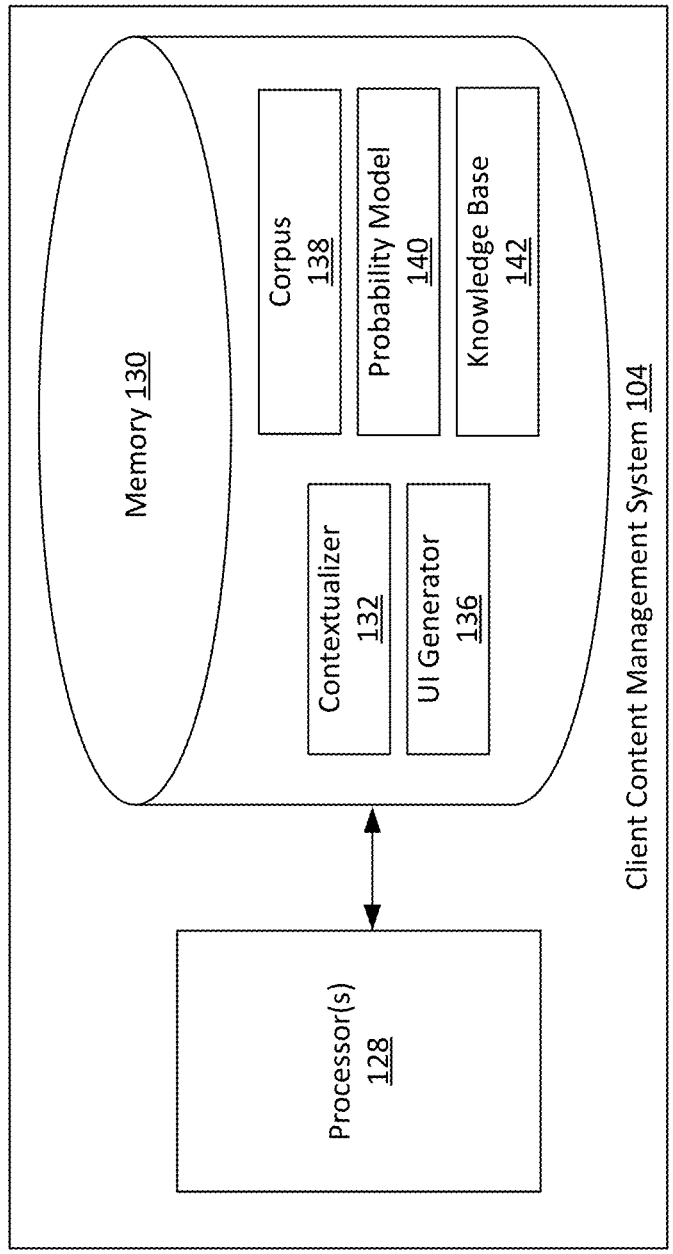
FIG. 2 illustrates an example content management system, in accordance with various embodiments described herein.

FIG. 2 illustrates an example system for a client content management system 104 in accordance with various embodiments of the disclosure. Though the content management system of FIG. 2 is shown as a client content management system 104, in various examples, the central content management system 102 may include components and/or functionality described with respect to the client content management system 104 in addition to the components and functionality described in FIG. 1. The client content management system 104 may include processors 128 and memory 130 including instructions for various functions of the client content management system 104. The processors 128 and memory 130 may be implemented using any of the components and/or methods described with respect to the processors 112 and the memory 114.

The memory 130 may include instructions for various functions of the client content management system 104, which, when executed by the processor 128, perform various functions of the content management system 102. For example, the memory 130 may include instructions for implementing a contextualizer 132 and a UI generator 136. The memory 130 may further include data utilized and/or created by the client content management system 104, such as a corpus 138, probability model 140, and/or knowledge space 142. The memory 130 may further include instructions for implementing delta positioning 133.

In various examples, when executed by the processors 128, instructions for the contextualizer 132 may generate the corpus 138 from various content items (e.g., content items stored at datastore 110), train and/or generate the probability model 140 to group concepts reflected in the corpus 138, and generate the knowledge space 142 using the probability model 140 and the content items. For example, the contextualizer 132 may process content items to generate the corpus 138. To process content items, the contextualizer 132 may generally convert content items into a data format which can be further analyzed to create the knowledge space 142. For example, the contextualizer 132 may include language processing, image processing, and/or other functionality to identify words within the content items and generate the corpus 138 including the significant and/or meaningful words identified from the content items. In various examples, the contextualizer 132 may use language and/or image processing to obtain words from the content items. The contextualizer 132 may then identify significant words using various methods, such as natural language processing to remove elements of the text such as extraneous characters (e.g., white space, irrelevant characters, and/or stem words extracted from the content) and remove selected non-meaningful words such as "to", "at", "from", "on", and the like. In forming the corpus, the contextualizer 132 may further remove newlines, clean text, stem and/or lemmatize words to generate tokens, remove common stop words, and/or clean tokens. In such examples, the corpus 138 may include groupings of meaningful words appearing within the content items.

The contextualizer 132 may generate and/or train the probability model 140 using the corpus 138. In various examples, the probability model 140 may be generated or trained using topic modeling, such as a latent Dirichlet allocation (LDA). In various examples, the probability model 140 may include statistical predictions or relationships between words in the corpus 138. For example, the probability model 140 may include connections between words in the corpus 138 and likelihoods of words in the corpus 138 being found next to or otherwise in the same content item as other words in the corpus 138. In some examples, the probability model 140 may infer positioning on of documents or items in the corpus 138 in a topic.

In various examples, the contextualizer 132 may form content groupings when generating and/or training the probability model 140. For example, the process of training the LDA model may result in a set of topics or concepts. An example of a concept may include a combination of words that have a high probability for forming the context in which other phrases in the corpus 138 might appear. For instance, in training a corpus 138 about 'CRISPR' (specialized stretches of DNA in bacteria and archaea), the LDA model may include "guide RNA design" as a topic or concept because it includes a high probability combination of words that other words appear in the context of CRISPR. In some examples, a topic may be an approximation of a concept. Words that are found within close proximity with one another in the corpus 138 are likely to have some statistical relationship, or meanings as perceived by a human.

Once the probability model 140 is generated, the contextualizer 132 may generate the knowledge space 142 using the probability model 140 and the content items. The knowledge space 142 may be, in various examples, a graph or other type of relational or linking structure that includes multiple nodes, the nodes representative of various content items (e.g., content items stored at datastore 110). The nodes of the knowledge space 142 may store the content items themselves and/or links to such content items. The graph may include multiple edges between nodes, where the edges include weights representing probabilities of two corresponding topics (nodes) belonging to the same concept or related concepts. Such probabilities may be used to position nodes representing the content items relative to one another in space. In various examples, edges between nodes of the knowledge space 142 may be weighted, where the weight represents a strength of the relation between nodes connected by the edge. As such, the knowledge space 142 may represent sets of relationships between the content items correlating to the knowledge space 142.

In generating the knowledge space 142, the contextualizer 132 may construct a graph of the knowledge space 142 by, for example, generating nodes of the knowledge space 142 from content items and topics identified in the probability model 140. Generating the nodes may include placing the nodes within a space of the knowledge space 142 based on the concepts included in the content item associated with the node.

The contextualizer 132 may further group nodes of the knowledge space 142 into content groupings. In various examples, the contextualizer 132 may use a clustering algorithm to create content groupings and organize the nodes into clusters. The contextualizer 132 may first generate a number of content groupings and determine centroids of the content groupings. In some examples, initial content groupings may be determined using the probability model 140. The contextualizer 132 may use a centroid value for the content groupings obtained from the probability model 140 or may initially assign a random value (e.g., spatial value) as a centroid of the content group. The contextualizer 132 may then assign each node of the knowledge space 142 to a content grouping based on the closest centroid to the node. Once all nodes have been assigned to a content group, new centroids may be re-calculated for each group by averaging the location of all points assigned to the content group. In various examples, the contextualizer 132 may repeat the process of assigning nodes to content groups and re-calculating centroids of the concept groups for a predetermined number of iterations or until some condition has been met (e.g., the initial centroid values match the re-calculated centroid values). As a result of the process of calculating the centroids, nodes may be assigned to content groups by the contextualizer 132.

In some examples, when a node is created for a new piece of content (e.g., added from the content bank 120 of the central content management system 102), the contextualizer 132 may adjust and/or rebuild the knowledge space based on the addition of additional nodes (e.g., nodes associated with content obtained from the content bank 120). For example, the contextualizer 132 may generate the corpus 138 based on the updated content items, re-train and/or generate the probability model 140 using the updated corpus 138, and generate an updated knowledge space 142 based on the updated content items and the re-generated probability model 140. The updated knowledge space 142 may include new content groupings and/or may be reshaped based on the additions of the new nodes to the knowledge space 142.

In some examples, instead of contextualizing the space when a new item is added (e.g., using contextualizer 132 to re-generate the corpus 138), instructions for delta positioning 133 may be used to position new (e.g., uploaded) content items within the knowledge space 142. Delta positioning 133 may generally analyze an incoming content item and position the content item within the knowledge space 142. Delta positioning 133 may identify a most similar topic or concept to the content item within the knowledge space 142, and place the content item within the concept. Such positioning may change a location of a center of the concept, but generally will not recontextualize the entire knowledge space 142.

Figure 10:
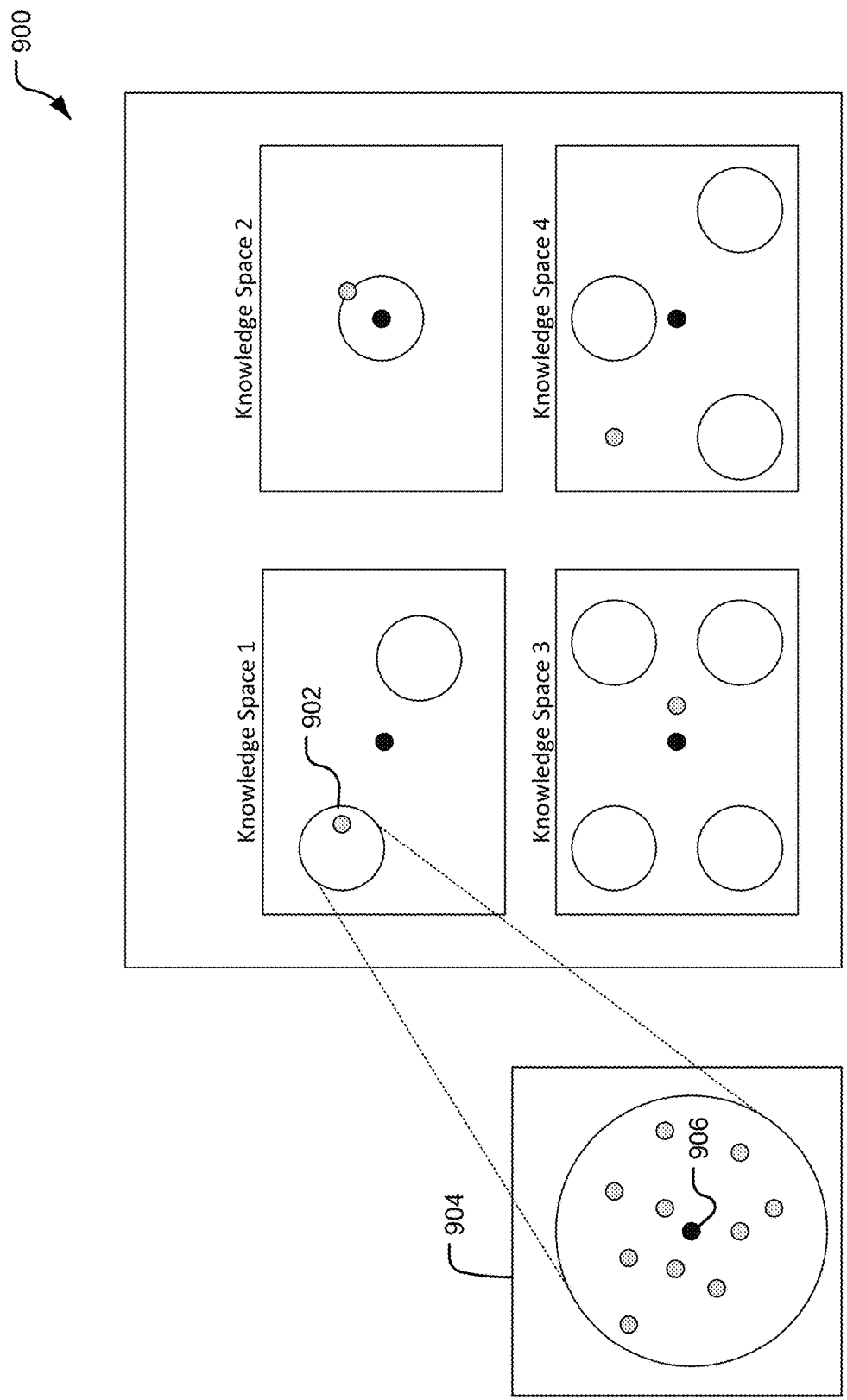
FIG. 10 illustrates an example user interface showing recommendations of content items for knowledge spaces, in accordance with various embodiments described herein.

Concepts and concept centers within knowledge spaces are depicted, for example, in FIG. 10. For example, FIG. 10 shows four knowledge spaces, with the centers of the knowledge spaces shown with black circles marking the centers of the knowledge spaces. Each knowledge space includes multiple concepts, which may be located within the knowledge spaces based on clusters of content items within the knowledge space. Accordingly, the number of concepts or concept clusters within a knowledge space may vary based on the content items within the knowledge spaces. For example, knowledge space one includes a concept grouping 902 shown in more detail in element 904. As shown, knowledge space one includes a conceptual center (e.g., accounting for all of the content items within the knowledge space) and, as shown in element 904, the concept grouping 902 includes its own conceptual center 906 (e.g., accounting for all of the content items within the concept grouping 902.

Returning to FIG. 2, in various examples, delta positioning 133 may identify the most similar topic or concept based on a comparison between the content item and centers of concept clusters of the knowledge space 142. For example, delta positioning 133 may compare an embedding (e.g., a multidimensional vector representing the content item) of the content item to a multidimensional vector representing a center of a concept. For example, a multidimensional vector representing the center of a concept may be an average of embeddings of content items grouped within the concept. The content item may then be placed within the identified concept based on the embedding representing the content item.

When executed by the processors 128, the instructions for UI generation 136 may access the knowledge space 142 generate various user interfaces (e.g., user interface 126) at user devices utilizing and/or accessing the client content management system 104.

Instructions for UI generation 136 may further generate user interfaces such as user interfaces 700 and 800 shown in FIGS. 8 and 9, respectively. With reference to FIG. 8, the user interface 700 shows how a recommended content item fits within a knowledge space. For example, the user interface 700 shows a title of the recommended content item and concepts associated with the content item, as determined by analysis of the content item. For example, the user interface 700 shows that the recommended content item is associated with "delete account," "access to data," and "right to be informed." The user interface 700 further shows a summary of the content item and knowledge spaces for which the content item is recommended. For each recommended knowledge space, the user interface 700 shows a level of recommendation (e.g., highly recommended, moderately recommended, similarity expressed as a percentage, and the like), a cost of adding the content item to the knowledge space, and a link allowing a user to purchase the item and add the item to the knowledge space.

UI generation 136 may communicate with other components of the central content management system 102 and/or the client content management system 104 to obtain the information in the user interface 700. UI generation 136 may further include elements which, when selected, provide the user with additional information about recommended content items and/or how the recommended content items fit into established knowledge spaces. For example, an element of the user interface 700 labeled "charts" may be selectable to show the user interface 800 shown in FIG. 9. For example, UI generation 136 may generate the user interface 800 upon selection of the charts element of user interface 700.

With reference to FIG. 9, the user interface 800 may show how a content item fits into a knowledge space. For example, a chart on the left of the user interface 800 shows how a content item fits within both data privacy and information security knowledge spaces. As shown, the content item fits within an overlap between the two knowledge spaces, such that the content item may be recommended for addition to both knowledge spaces. The chart further shows the location of the content item relative to centers of the knowledge spaces. In some examples, a content item may be more highly recommended when the content item is placed closer to a center of a knowledge space. Similarly, a chart on the right of the user interface 800 shows how a content item fits within the same data privacy and information security knowledge spaces. As shown, the content item fits within the information security knowledge space but does not fit within the data privacy knowledge space. Accordingly, the content item may not be recommended for addition to the data privacy knowledge space. In various examples, charts such as those shown in the user interface 800 may assist users in further evaluating relevance of various content items, which may help users assess the advantages of purchasing such content items.

In various examples, UI generation 136 may configure and/or generate other user interfaces described herein and/or including information, data, and the like described herein. For example, UI generation 136 may display representations of the knowledge space 142, representations of content groupings (e.g., tags, concepts, or other indicators of concepts represented in a content grouping), user interfaces configured to receive input to add new content items to the knowledge space 142, to place content items of the knowledge space 142 in the content bank 120, and the like.

Figure 3:
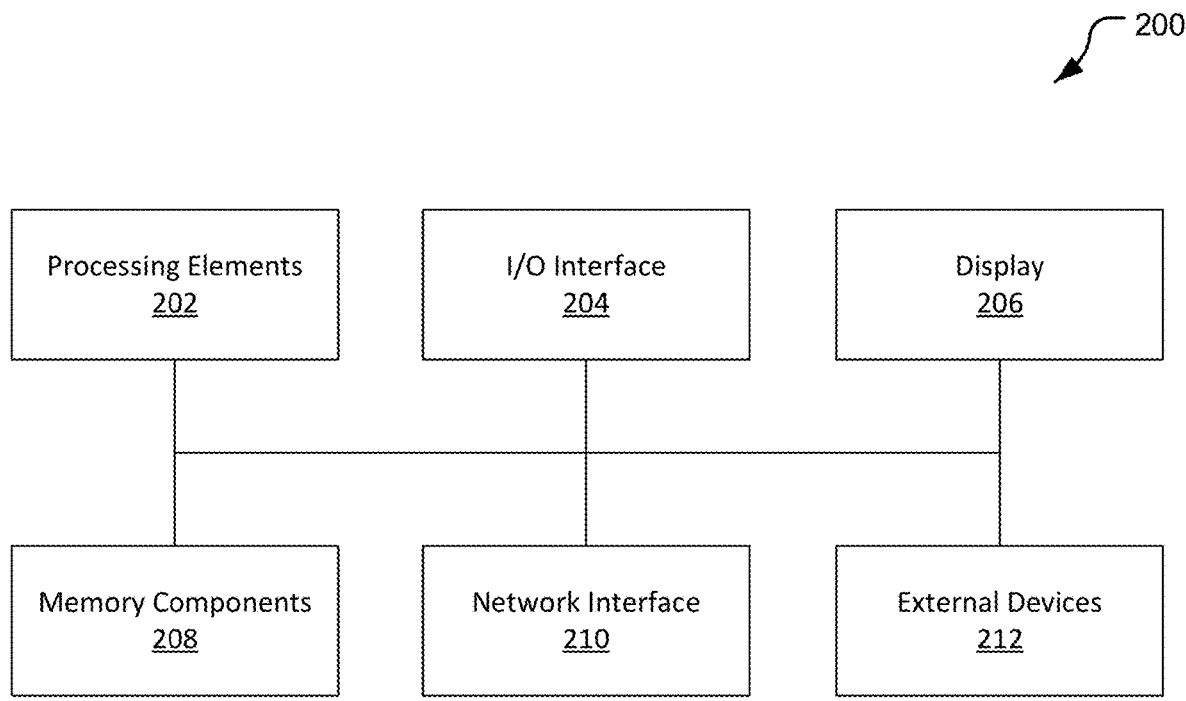
FIG. 3 is a schematic diagram of an example computer system implementing various embodiments in the examples described herein.

FIG. 3 shows a simplified block structure for a computing device 200 that may be used with the system 100 (in FIG. 1) or integrated into one or more components of the system. For example, the content management system 102, user device 105, or one or more other devices in communication with or included in the content management system 102 may include one or more of the components shown in FIG. 3 and be used to implement one or more blocks or execute one or more of the components or operations disclosed herein. In FIG. 3, the computing device 200 may include one or more processing elements 202, an input/output interface 204, a display 206, one or more memory components 208, a network interface 210, and one or more external devices 212. Each of the various components may be in communication with one another through one or more busses, wireless means, or the like.

The processing element 202 may be any type of electronic device capable of processing, receiving, and/or transmitting instructions. For example, the processing element 202 may be a central processing unit, microprocessor, processor, or microcontroller. Additionally, it should be noted that some components of the computer 200 may be controlled by a first processor and other components may be controlled by a second processor, where the first and second processors may or may not be in communication with each other.

The memory components 208 are used by the computer 200 to store instructions for the processing element 202, as well as store data, such as the corpus 138, probability model 140, knowledge space 142, content bank 120 and the like. The memory components 208 may be, for example, magneto-optical storage, read-only memory, random access memory, erasable programmable memory, flash memory, or a combination of one or more types of memory components.

The display 206 provides visual feedback to a user, such as displaying questions or content items or displaying recommended content, as may be implemented in the user interfaces 122 and/or 124 (FIG. 1). Optionally, the display 206 may act as an input element to enable a user to control, manipulate, and calibrate various components of the computing device 200. The display 206 may be a liquid crystal display, plasma display, organic light-emitting diode display, and/or other suitable display. In embodiments where the display 206 is used as an input, the display may include one or more touch or input sensors, such as capacitive touch sensors, resistive grid, or the like.

The I/O interface 204 allows a user to enter data into the computer 200, as well as provides an input/output for the computer 200 to communicate with other devices or services. The I/O interface 204 can include one or more input buttons, touch pads, and so on.

The network interface 210 provides communication to and from the computer 200 to other devices. For example, the network interface 210 allows the content management system 102 to communicate with the datastore 110, the user device 105 via a communication network (in FIG. 1). The network interface 210 includes one or more communication protocols, such as, but not limited to WiFi, Ethernet, Bluetooth, and so on. The network interface 210 may also include one or more hardwired components, such as a Universal Serial Bus (USB) cable, or the like. The configuration of the network interface 210 depends on the types of communication desired and may be modified to communicate via WiFi, Bluetooth, and so on.

The external devices 212 are one or more devices that can be used to provide various inputs to the computing device 200, e.g., mouse, microphone, keyboard, trackpad, or the like. The external devices 212 may be local or remote and may vary as desired. In some examples, the external devices 212 may also include one or more additional sensors that may be used in obtaining user's assessment variables.

Figure 4:
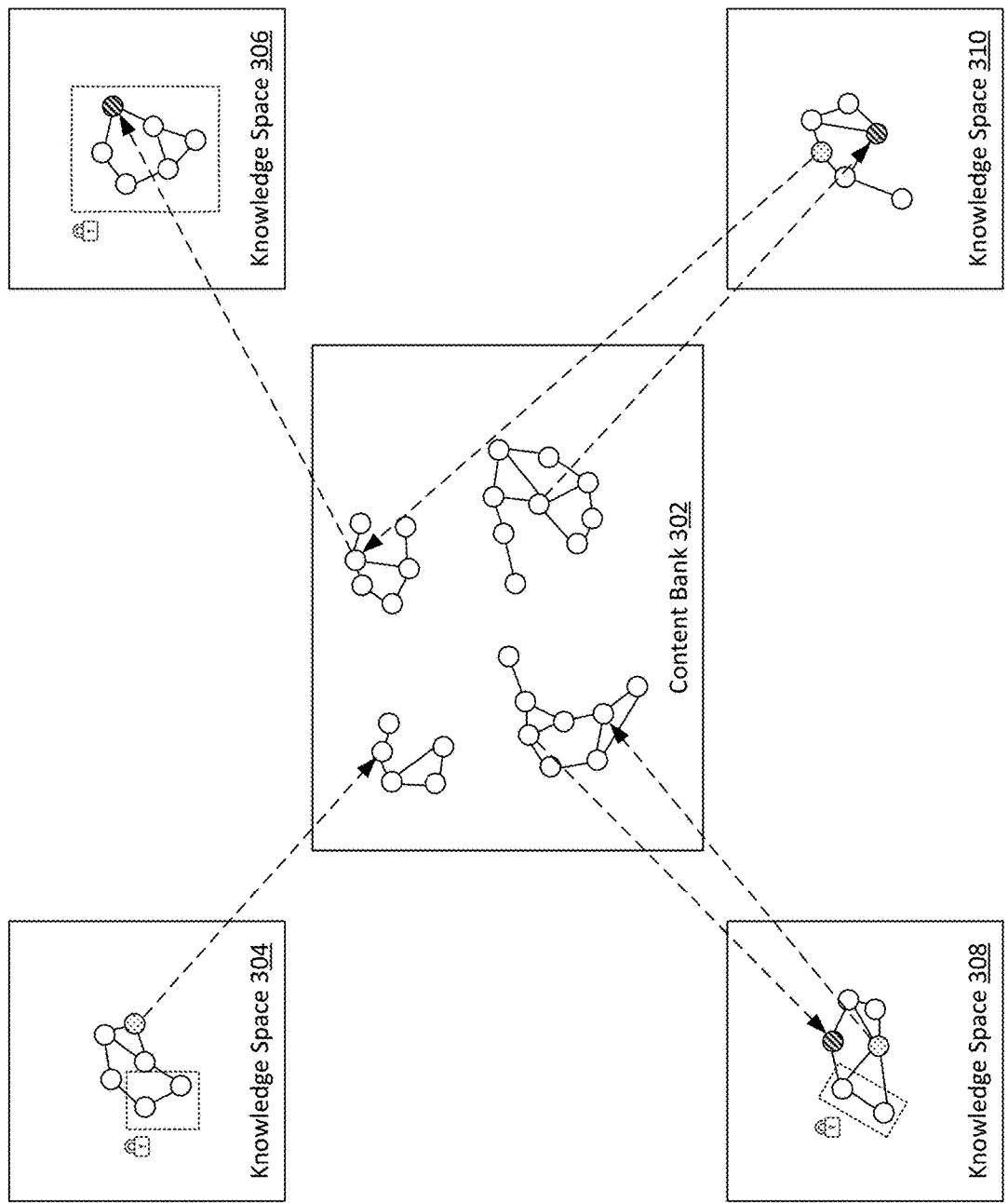
FIG. 4 illustrates example exchanges between a content bank and knowledge spaces, in accordance with various embodiments described herein.

FIG. 4 illustrates example exchanges between a content bank 302 and knowledge spaces 304, 306, 308, and 310. In various examples, the knowledge spaces 304, 306, 308, and 310 may be associated with different organizations. In other examples, two or more of the knowledge spaces 304, 306, 308, and 310 may be associated with the same organization but may be geared towards different topics, courses, trainings, and the like. Different knowledge spaces may further be associated with different departments within the same organization. For example, knowledge space 304 and knowledge space 306 may be associated with the same organization, but knowledge space 304 may include content items related to cybersecurity training while knowledge space 306 includes content items related to laboratory safety procedures. The knowledge spaces 304, 306, 308, and 310 may each be configured to provide content items to and/or obtain content items from the content bank 302. In various examples, a knowledge space (e.g., knowledge spaces 308 and 310) which both provide content items to and obtain content items from the content bank 302 may be referred to as being configured for bidirectional trading while a knowledge space which only provides content items to the content bank 302 (e.g., knowledge space 304) or a knowledge space which only obtains content items from the content bank 302 (e.g., knowledge space 306) may be referred to as being configured for unidirectional training.

As shown in FIG. 4, a knowledge space may be configured such that some or all of the content items in the knowledge space are secured, that is, the content items are not provided to the content bank 302 and, where applicable, are not available to other knowledge spaces configured to trade directly with the knowledge space. In some examples, individual content items, groups of content items related to similar concepts (e.g., concept groupings), and/or the entire knowledge space may be secured. A user (e.g., through an administrative portal) may configure security settings for the knowledge space. When a portion of a knowledge space is secured, other content items in an unsecured portion of the knowledge space may still be provided to the content bank 302. For example, knowledge space 304 includes a secured portion, but a content item of the knowledge space 304 in the unsecured portion is contributed to the content bank 302. In some examples, a portion of a knowledge space including content items obtained from the content bank 302 may be secured. For example, all of knowledge space 306 is secured, but the knowledge space 306 includes a content item obtained from the content bank 302.

In some examples, content items may be shared between knowledge spaces using the content bank 302 as an intermediary. For example, a content item from knowledge space 310 is contributed to the content bank 302. The same content item is then obtained from the content bank 302 by the knowledge space 306. In some examples, one content item may be utilized by multiple knowledge spaces.

Figure 5:
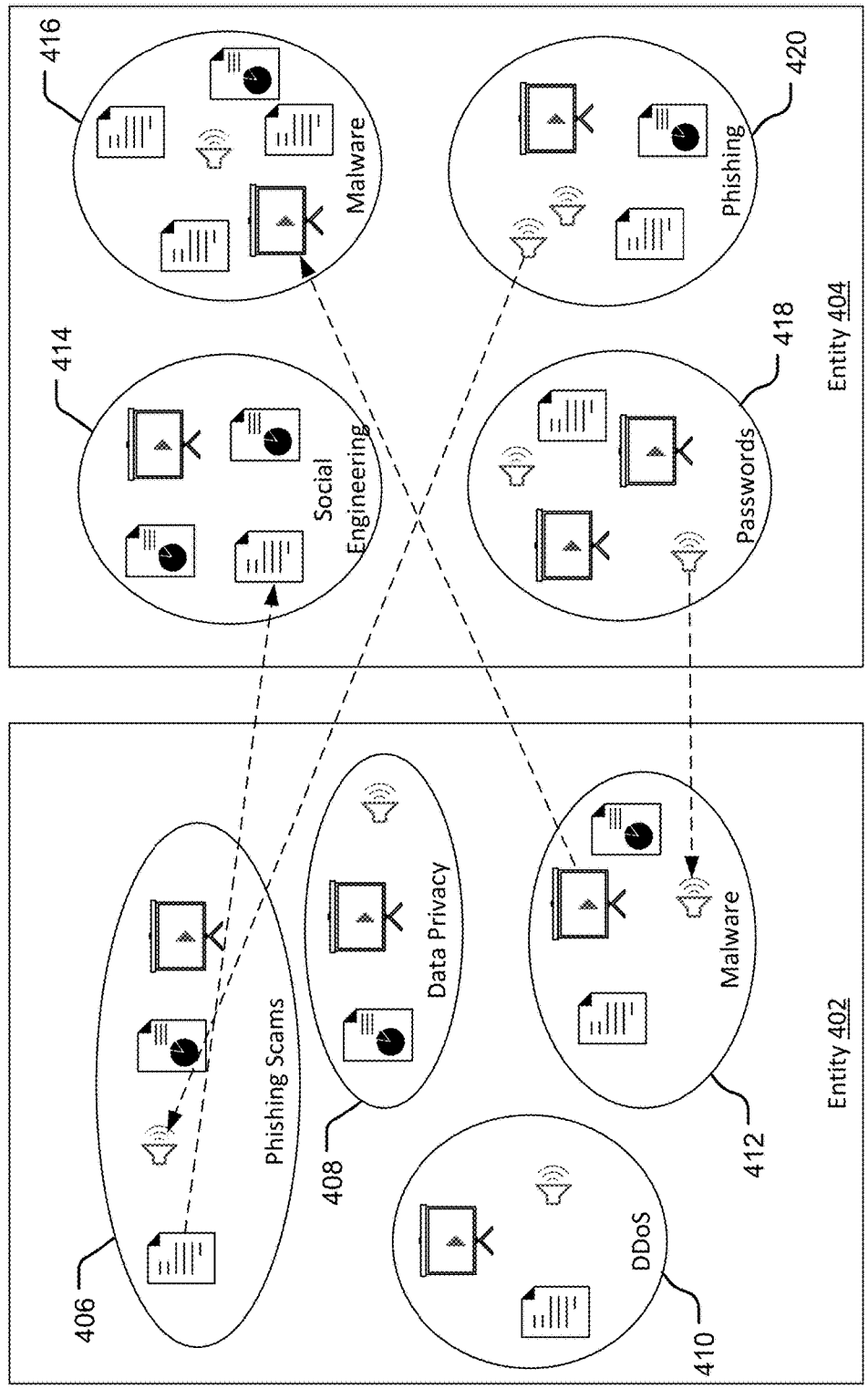
FIG. 5 illustrates example exchanges of content items between a first entity and a second entity, in accordance with various embodiments described herein.

FIG. 5 illustrates example exchanges of content items between a first entity 402 and a second entity 404. Such exchanges between, for example, peer entities, may be accomplished directly between the two entities without moving through a centralized content bank. Such exchanges may be advantageous in partnerships between organizations, including to exchange content in the case of mergers, large projects, or other large projects or operations. Entities 402 and 404 may be individuals, groups, departments, entire organizations, and the like. In some examples, the first entity 402 and the second entity 404 may be matched with one another by the content bank manager 118. For example, when one of the first entity 402 and the second entity 404 configures its knowledge spaces for content trading using the central content management system 102, the content bank manager 118 may calculate a center for the knowledge spaces and concept centers utilized by the entity and a center for the entity as a whole. The content bank manager 118 may then compare the centers for the entity to centers of other entities configured to utilize the central content management system 102. Entities with very similar centers likely utilize knowledge spaces with similar content items and, accordingly, may benefit from directly trading content items. For example, the first entity 402 and the second entity 404 each utilize knowledge spaces generally related to elements of cybersecurity.

As shown in FIG. 5, the first entity 402 may utilize knowledge spaces 406, 408, 410, and 412 including content items related to phishing scams, data privacy, DDoS, and malware, respectively. The second entity 404 may utilize knowledge spaces 414, 416, 418, and 420 related to social engineering, malware, passwords, and phishing, respectively. Though the first entity 402 and the second entity 404 do not utilize overlapping knowledge spaces (e.g., there is not a one-to-one correlation between the knowledge spaces 406, 408, 410, and 412 and the knowledge spaces 414, 416, 418, and 420), the entities may have similar organizational or entity centers. For example, the knowledge spaces may include similar types of content, even though the spaces are grouped differently.

In various examples, the first entity 402 may offer content items to the second entity 404 and receive content items from the second entity 404. Similarly, the second entity 404 may offer content items to the first entity 402 and receive content items from the first entity 402. Accordingly, the entity 402 and the entity 404 can share in the work of creating and locating content items for cybersecurity education, reducing duplicate efforts between the first entity 402 and the second entity 404. In various examples, the first entity 402 and/or the second entity 404 may subscribe to particular content items from the other entity. Such subscription may mean that the subscribing entity may use the content item, but may not offer the content item for sale elsewhere (e.g., to the content bank 120). Further, when the content item is updated and/or deleted at the other entity, the content item may be similarly updated and/or deleted at the subscribing entity. For example where entity 404 is subscribed to video content from the entity 402 and the entity 402 makes a change to the video content (e.g., adding additional content to the video content), the video content may be similarly updated at the corresponding knowledge space of the entity 404. In some cases, the location of the content item within the knowledge space of the entity 404 may be updated to reflect the additional and/or changed concepts covered in the video content.

Though the first entity 402 and the second entity 404 may be configured to directly exchange content items with one another, in various embodiments, the central content management system 102 may continue to perform some operations related to the transfer of content items between the first entity 402 and the second entity 404. For example, the content asset suggestion module 116 may suggest content items for transfer from one entity to another and may determine pricing of content items being transferred between the first entity 402 and the second entity 404. In some examples, the content bank manager 118 may continue to analyze quality of content items being transferred between the first entity 402 and the second entity 404. The content asset transfer module 122 may, in some examples, locate transferred content items within knowledge spaces of the receiving entity and otherwise facilitate transfer of content items. Accordingly, the first entity 402 and the second entity 404 may exchange content items while the central content management system 102 facilitates such transfer.

Figure 6:
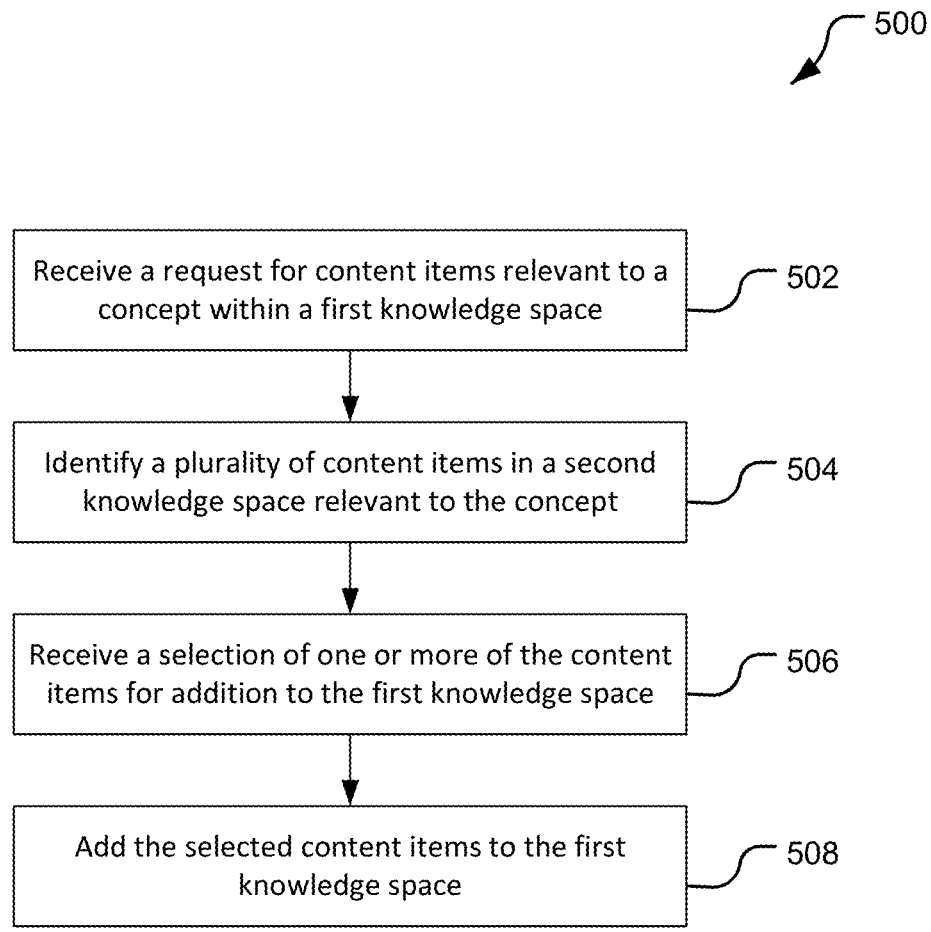
FIG. 6 is a flowchart illustrating an example method of adding content items from a central content bank to a knowledge space, in accordance with various embodiments described herein.

FIG. 6 is a flowchart illustrating an example method 500 of adding content items from a central content bank (e.g., content bank 120) to a knowledge space (e.g., knowledge space 142). In some examples, the method 500 may be used to add portions of content items from the central content back to a knowledge space. For example, a chapter of a textbook relevant to a desired concept may be added to a knowledge space rather than adding the entire textbook. Relevant portions of larger content items may be identified, in various examples, using a concept tracking system, such as described in U.S. patent application Ser. No. 17/930,643, titled Tracking of Concepts within Content in Content Management Systems and Adaptive Learning Systems, the disclosure of which is hereby incorporated herein for any purpose.

At block 502, the central content management system 102 (e.g., content bank manager 118) receives a request for content items relevant to a concept within a first knowledge space. In various examples, the request may be a selection of a content item within a first knowledge space, indicating that the user would like to identify additional content items similar to the selected content item. In some examples, the user may select a content grouping within a knowledge space (e.g., a grouping of content items directed to a similar concept) to find additional content items that would fit within the content grouping. In some examples, a user may simply select an option to locate content items which may be relevant to a knowledge space or group of knowledge spaces (e.g., all knowledge spaces associated with an organization) without selecting a particular concept or concepts. In some examples, a user may select a particular concept identified as being present in knowledge spaces of similar or competing, collaborating, or partnering organizations that is not currently covered in the user's existing knowledge spaces. In such examples, a certain number of content nodes may be recommended for the user's knowledge space and may be placed within the knowledge space using contextualization or delta-postioning.

The central content management system 102 identifies a plurality of content items in a second knowledge space relevant to the concept at block 504. In some examples, the second knowledge space may be a content bank 120 at a central content management system 102. In such examples, the content asset suggestion module 116 may search the content bank 120 for relevant content items based on a vector derived from the request received at block 502. For example, where the request includes selection of a particular content item, the vector may be an embedding vector representative of the content item. Where the request includes selection of a content grouping, knowledge space, or organization, the vector may represent a theoretical center (e.g., average of embeddings of all nodes) in the content grouping, knowledge space, or organization, respectively.

The content asset suggestion module 116 may utilize the vector by calculating a distance between the vector and embedding vectors representing the nodes of the content bank 120. In various examples, the content asset suggestion module 116 may identify nodes of the content bank 120 within a threshold distance of the vector. The content asset suggestion module 116 may, in some examples, utilize several threshold distances to identify content items which are highly relevant to the request, content items which are moderately relevant to the request, and content items with a low relevance to the request. For example, the content items associated with embedding vectors closest in distance to the vector representing the request may be highly relevant to the request.

In some examples, the knowledge space may be a knowledge space associated with another organization (e.g., an entity configured to utilize the central content management system 102 for exchange of content items). In such examples, identifying the plurality of content items in the second knowledge space may include first identifying the second knowledge space as similar to the first knowledge space. For example, the content bank manager 118 may analyze the first knowledge space and identify the second knowledge space as being similar to the first knowledge space. Such analysis may include creation of embedding vectors representing each content item in the first knowledge space, and calculating a center of the first knowledge space by averaging the embedding vectors. The content bank manager 118 may then compare the center of the first knowledge spaces to centers of other knowledge spaces utilizing the central content management system 102. The second knowledge space may be a knowledge space with a center close in distance to the center of the first knowledge space and/or may be selected by the user from a list of similar knowledge spaces. Once the second knowledge space is identified, the content asset suggestion module 116 may identify the plurality of content items using the same process described with respect to the content bank 120.

At block 506, the central content management system 102 receives a selection of one or more content items for addition to the first knowledge space. In various examples, the selection may be received through a user interface (e.g., user interface 126) of a user device 105 utilizing the central content management system 102. For example, in various embodiments, the content asset suggestion module 116 may present the plurality of content items to the user via the user interface 126. The content asset suggestion module 116 may present additional information about the plurality of content items, such as prices of the items, previews of portions of the content items, asset type of the content items (e.g., video content, audio content, or text content), general concepts covered by the content items, relevance of the content items to the first knowledge space, and the like through the user interface 126. The user may then utilize the information to select content items of the plurality of content items to add to the first knowledge space.

In some examples, the user interface may present the concept coverage and quality of any given knowledge space prior to any content trading or sharing and may then provide the ability for the user to select a desired concept coverage and quality for the selected knowledge space. In such examples, the asset suggestion module 116 may select the content elements required to achieve the desired resulting concept coverage and quality. The user may then be prompted to purchase the desired concept coverage directly and may be able to calibrate the selection by reviewing suggested content items selected by the content asset suggestion module.

The selected content items are added to the knowledge space at block 508. The central content management system 102 may determine how to position content items within the knowledge space 142 based on user settings, similarity of the content items to existing topics and/or concepts in the knowledge space 142, and the like. For example, some users may choose user settings not allowing recontextualization of the knowledge space 142. In these examples, delta positioning may be used. In some examples, user settings may allow for recontextualization where beneficial. In such examples, a similarity threshold may be selected to compare content items to concepts within the knowledge space. Where a similarity score is above a certain threshold, the content item may be positioned within the concept. In such examples, the center of the concept may be updated based on the added content item, but the knowledge space 142 is generally not recontextualized. Where there are no concepts in the knowledge space 142 resulting in a similarity score above the threshold, the knowledge space 142 may be recontextualized to add the content items to the knowledge space 142.

In some examples, the first knowledge space is recontextualized to add the selected content items to the knowledge space. For example, the content items may be added to a corpus 138 correlating to the first knowledge space. The updated corpus 138 may then be used to generate a new probability model 140, and the first knowledge space 142 may be built anew based on the new probability model 140. The recontextualized first knowledge space may include nodes representing the selected content items and content items previously in the first knowledge space. The recontextualized first knowledge space may further include a set of relationships between the nodes of the recontextualized first knowledge space.

In some examples, the selected content items may be added to the knowledge space using delta positioning. Delta positioning 133 may locate a content item within a concept with a highest similarity to the content item. For example, similarity may be determined by comparing an embedding of the content item to an embedding of a center for the concept. The content item may then be placed within the concept using the embedding of the content item to place the content item in the space of the concept. In some examples, the concept center may change when a new item is added.

In some examples, items added to the knowledge space may be duplicated from the content bank (or other knowledge space of origin) and the duplicated version of the item may be added to the knowledge space. In such examples, custom updates to the content item may be made by an entity or organization without affecting copies of the content item used in other knowledge spaces. A content item may, in other examples, remain stored in the content bank, with the node in the knowledge space referencing the copy of the content item in the content bank. In such examples, any updates, corrections, or edits to the content item in the content bank may automatically be reflected in any knowledge spaces referencing the content item. For example, a user in any knowledge space may be presented with the updated content item wherever the content appears or is used. This may increase efficiency when updating content items, as only one copy of the content item is updated manually, with updates being immediately reflected wherever the content item is used.

Figure 7:
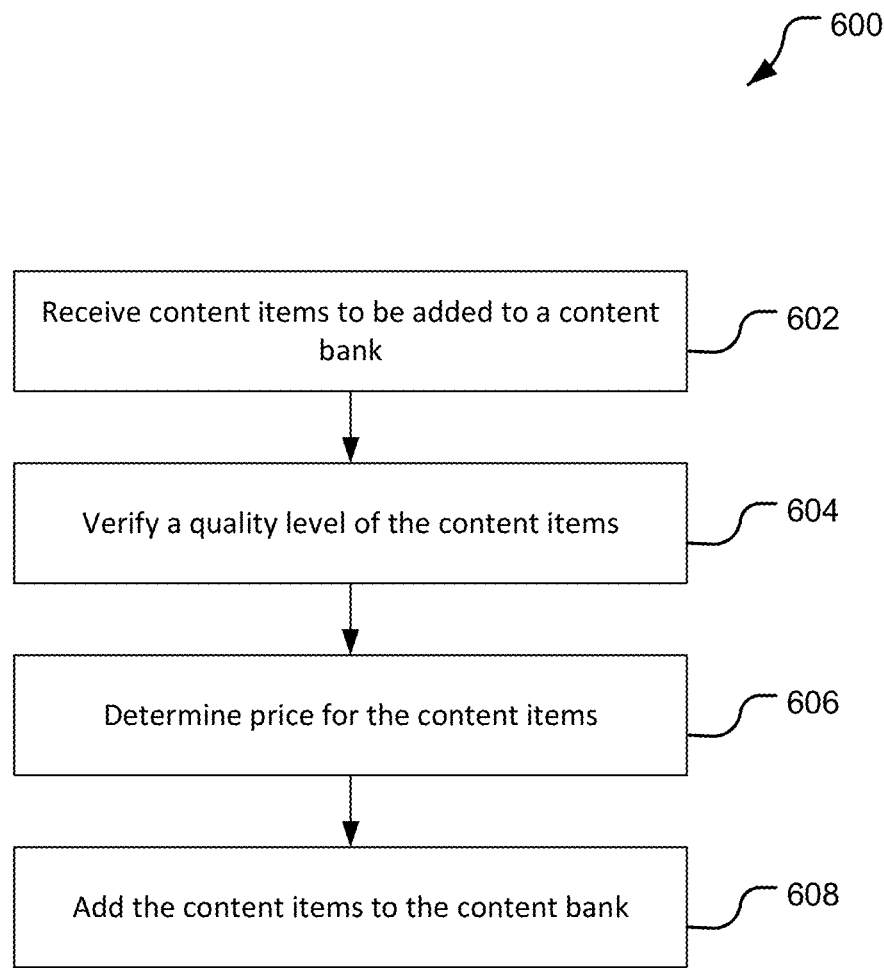
FIG. 7 is a flowchart illustrating an example method of adding content items to a central content bank, in accordance with various embodiments described herein.

FIG. 7 is a flowchart illustrating an example method of adding content items to a central content bank (e.g., content bank 120). At block 602, the central content management system 102 receives content items to be added to a content bank 120. The content items may be located in a knowledge space 142 and may be individually selected by a user to be added to the content bank 120. For example, an organization may wish to offer specific content items for sale to the content bank 120. In some examples, the content items may be sent to the content bank 120 at the same time that the content items are added to the knowledge space 142. In some examples, the content items may be all content items in the knowledge space 142 which are not protected (e.g., content items having security settings allowing the content items to be shared to the content bank 120).

The central content management system 102 verifies a quality level of the content items at block 604. The content bank manager 118 may verify quality level based on length, accuracy, lexical complexity, user appreciation, user interaction metrics (e.g., time spent in the content), difference in conceptually linked assessment item performance before and after viewing the content, and/or other attributes of the content items. Such verification may ensure that items added to the content bank 120 by users are of a similar quality level and may be used by other organizations without significant review.

At block 606, the central content management system 102 determines prices for the content items. In various examples, the content bank manager 118 may determine price for the content items using an adaptive pricing model. For example, items that are not similar to items already in the content bank 120 (e.g., items covering concepts not already covered by other content items) may be priced higher than other content items. Similarly, content items which are richer in format (e.g., video content as opposed to text only content) may be priced higher than other content. Other factors may be considered when pricing content items, such as length of the content items, quality of the content items, and the like.

The central content management system 102 adds the content items to the content bank 120 at block 608. In some examples, the central content management system 102 may recontextualize the content bank 120 to add the content items to the content bank 120. For example, the content items may be added to a corpus correlating to the content bank 120. The updated corpus may then be used to generate a new probability model, and the content bank 120 may be built anew based on the new probability model. The recontextualized content bank 120 may include nodes representing the selected content items and content items previously in the content bank 120. The recontextualized content bank 120 may further include a set of relationships between the nodes of the recontextualized content bank 120.

In some examples, the central content management system 102 may use delta positioning to add the content items to the content bank 120. For example, the content management system 102 may locate a concept or topic (e.g., a cluster of content items within the content bank) with a center closest to the content items. For example, an embedding (e.g., a multidimensional vector) representing each content item may be compared to multidimensional vectors representing the centers of various concepts within the content bank 120. Once the content management system 102 locates the most similar concept, a content item may be placed within the cluster of the concept using the embedding representing the content item. The process may be repeated for any additional content items being added to the content bank 120.

In accordance with the above disclosure, the central content management system 102 described herein may facilitate commercial trading or sharing of content within or between various organizations in a manner that may save duplicated efforts and computing resources for organizations. The central content management system 102 may further facilitate the identification of content item similarity in different contexts at scale with precise gradations of similarity across the full spectrum from highly unrelated to identical. For example, the central content management system 102 may identify content items which may be of interest to an organization by utilizing information about content items already used by the organization. Such identification may be particularly valuable where two organizations have, for example, undergone a merger or acquisition and are seeking to unify content and operations. This saves the organization time in having to create new content and/or search for other content. Further, the central content management system 102 may be able to identify additional content items that human users may not identify without analysis of knowledge spaces. For example, humans may search using keywords or other searches which are limited in their applicability and utility. The central content management system 102 may be more effective than such searches in identifying similar content due to the depth of analysis used by the central content management system 102. The central content management system 102 may further facilitate sharing of content items between organizations by identifying similar organizations based on the content used by the organizations and simplifying the process of sharing content items by providing a pricing framework, conducting quality review, and the like. The systems described herein may further be useful in quickly locating similar content with highly context specific results, such as movies, transcripts of calls, meeting minutes, and the like. The system may also be used to find and aggregate similar discussion topics, product reviews, feedback (e.g., from employees or customers), and the like. As the system may be useful in identifying similar content, the system may be further useful in identifying plagiarism, copying, and the like. Other uses are contemplated herein.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method comprising:
receiving a request for content items relevant to a concept within a first knowledge space, the first knowledge space including a plurality of concept groupings of a plurality of nodes representing a plurality of content items;
identifying a plurality of content items in a second knowledge space relevant to the concept;
receiving a selection of one or more of the content items in the second knowledge space for addition to the first knowledge space;
adding the selected one or more content items to the first knowledge space;
determining an operation to position the selected one or more content items in the first knowledge space based on comparing a similarity score for the selected one or more content items and the plurality of content items in the first knowledge space to a threshold value,
wherein the determined operation comprises delta positioning or recontextualizing, wherein delta positioning comprises placing the selected one or more content items within a most similar concept and adjusting a center of the most similar concept without recontextualizing, and
wherein recontextualizing comprises generating a probability model and updating a plurality of relationships between the plurality of nodes of the first knowledge space based at least in part on the probability model; and
performing the determined operation to position the selected one or more content items in the first knowledge space.

2. The method of claim 1, wherein adding the selected content items to the first knowledge space comprises locating nodes corresponding to the selected content items within a space of the first knowledge space.

3. The method of claim 1, wherein the concept within the first knowledge space is an embedding vector representing a conceptual center of the first knowledge space, wherein identifying the plurality of content items in the second knowledge space relevant to the concept comprises comparing embedding vectors of the content items in the second knowledge space to the embedding vector representing the conceptual center of the first knowledge space.

4. The method of claim 1, wherein the second knowledge space is a centralized content bank.

5. The method of claim 1, wherein the second knowledge space is selected based on a similarity between the first knowledge space and the second knowledge space, wherein the similarity is determined based on a distance between a spatial center of the first knowledge space and a spatial center of the second knowledge space.

6. The method of claim 1, further comprising determining a quality level, a price, or an asset type for the selected content items.

7. The method of claim 1, wherein recontexualizing further comprises rebuilding the first knowledge space based on the probability model.

8. The method of claim 1, wherein the plurality of nodes are associated with corresponding attributes associated with the plurality of content items, wherein the corresponding attributes comprise usage statistics, user interaction data, or content ratings, and wherein the plurality of content items in the second knowledge space is identified based at least in part on the corresponding attributes.

9. The method of claim 1, wherein the first knowledge space further includes a plurality of edges associated with the plurality of nodes, wherein the plurality of edges include weights representing probabilities of respective node pairs of the plurality of nodes belonging to a same concept or a related concept, and wherein the plurality of concept groupings are based at least in part on the weights.

10. A system comprising:
at least one processor; and
at least one non-transitory medium encoded with instructions that, when executed by the at least one processor, cause the system to perform operations comprising:
receiving a request for content items relevant to a concept within a first knowledge space, the first knowledge space including a plurality of concept groupings of a plurality of nodes representing a plurality of content items;
identifying a plurality of content items in a second knowledge space relevant to the concept;
receiving a selection of one or more of the content items in the second knowledge space for addition to the first knowledge space;
adding the selected one or more content items to the first knowledge space;
determining an operation to position the selected one or more content items in the first knowledge space based on comparing a similarity score for the selected one or more content items and the plurality of content items in the first knowledge space to a threshold value,
wherein the determined operation comprises delta positioning or recontextualizing,
wherein delta positioning comprises placing the selected one or more content items within a most similar concept and adjusting a center of the most similar concept without recontextualizing, and
wherein recontextualizing comprises generating a probability model and updating a plurality of relationships between the plurality of nodes of the first knowledge space based at least in part on the probability model; and
performing the determined operation to position the selected one or more content items in the first knowledge space.

11. The system of claim 10, wherein adding the selected content items to the first knowledge space comprises locating nodes corresponding to the selected content items within a space of the first knowledge space.

12. The system of claim 10, wherein the concept within the first knowledge space is an embedding vector representing a conceptual center of the first knowledge space, wherein identifying the plurality of content items in the second knowledge space relevant to the concept comprises comparing embedding vectors of the content items in the second knowledge space to the embedding vector representing the conceptual center of the first knowledge space.

13. The system of claim 10, wherein the second knowledge space is a centralized content bank.

14. The system of claim 10, wherein the second knowledge space is selected based on a similarity between the first knowledge space and the second knowledge space, wherein the similarity is determined based on a distance between a spatial center of the first knowledge space and a spatial center of the second knowledge space.

15. The system of claim 10, wherein the operations further comprise determining a quality level, a price, or an asset type for the selected content items.

16. A non-transitory computer-readable medium encoded with instructions that, when executed by a processor, cause the processor to perform operations comprising:
   receiving a request for content items relevant to a concept within a first knowledge space, the first knowledge space including a plurality of concept groupings of a plurality of nodes representing a plurality of content items;
   identifying a plurality of content items in a second knowledge space relevant to the concept;
   receiving a selection of one or more of the content items in the second knowledge space for addition to the first knowledge space;
   adding the selected one or more content items to the first knowledge space;
   determining an operation to position the selected one or more content items in the first knowledge space based on comparing a similarity score for the selected one or more content items and the plurality of content items in the first knowledge space to a threshold value,
      wherein the determined operation comprises delta positioning or recontextualizing, wherein delta positioning comprises placing the selected one or more content items within a most similar concept and adjusting a center of the most similar concept without recontextualizing, and
      wherein recontextualizing the first knowledge space comprises generating a probability model and updating a plurality of relationships between the plurality of nodes of the first knowledge space based at least in part on the probability model; and
   performing the determined operation to position the selected one or more content items in the first knowledge space.

17. The computer-readable medium of claim 16, wherein adding the selected content items to the first knowledge space comprises locating nodes corresponding to the selected content items within a space of the first knowledge space.

18. The computer-readable medium of claim 16, wherein the concept within the first knowledge space is an embedding vector representing a conceptual center of the first knowledge space, wherein identifying the plurality of content items in the second knowledge space relevant to the concept comprises comparing embedding vectors of the content items in the second knowledge space to the embedding vector representing the conceptual center of the first knowledge space.

19. The computer-readable medium of claim 16, wherein the second knowledge space is a centralized content bank.

20. The computer-readable medium of claim 16, wherein the second knowledge space is selected based on a similarity between the first knowledge space and the second knowledge space, wherein the similarity is determined based on a distance between a spatial center of the first knowledge space and a spatial center of the second knowledge space.

21. The computer-readable medium of claim 16, wherein the operations further comprise determining a quality level, a price, or an asset type for the selected content items.

\* \* \* \* \*